(12) United States Patent
Nedelcu et al.

(10) Patent No.: US 8,145,737 B2
(45) Date of Patent: *Mar. 27, 2012

(54) IMPLEMENTING COMPUTER APPLICATION TOPOLOGIES ON VIRTUAL MACHINES

(75) Inventors: Laurentiu T. Nedelcu, Redmond, WA (US); Maor Kashansky, Sammamish, WA (US); Radu V. Ionescu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1424 days.

This patent is subject to a terminal disclaimer.

(21) Appl. No.: 11/323,995

(22) Filed: Dec. 30, 2005

(65) Prior Publication Data

US 2007/0156860 A1    Jul. 5, 2007

(51) Int. Cl.
G06F 15/173 (2006.01)
G06F 9/455 (2006.01)
G06F 17/00 (2006.01)

(52) U.S. Cl. .................. 709/223; 718/1; 707/600

(58) Field of Classification Search .......... 709/223–224; 715/200, 220; 707/200
See application file for complete search history.

(56) References Cited

U.S. PATENT DOCUMENTS

| | | | |
|---|---|---|---|
| 5,185,860 A * | 2/1993 | Wu | 709/224 |
| 5,276,789 A * | 1/1994 | Besaw et al. | 345/440 |
| 5,504,921 A * | 4/1996 | Dev et al. | 709/223 |
| 5,727,157 A * | 3/1998 | Orr et al. | 709/224 |
| 5,948,055 A | 9/1999 | Pulsipher et al. | |
| 6,108,702 A | 8/2000 | Wood | |
| 6,205,122 B1 | 3/2001 | Sharon et al. | |
| 6,259,448 B1 | 7/2001 | McNally et al. | |
| 6,377,987 B1 | 4/2002 | Kracht | |
| 6,477,572 B1 | 11/2002 | Elderton et al. | |
| 6,763,403 B2 | 7/2004 | Cheng et al. | |
| 6,833,850 B1 | 12/2004 | Arquie et al. | |
| 7,013,461 B2 | 3/2006 | Hellerstein et al. | |
| 7,103,647 B2 | 9/2006 | Aziz | |
| 7,120,874 B2 | 10/2006 | Shah et al. | |
| 7,162,509 B2 | 1/2007 | Brown et al. | |
| 7,630,877 B2 | 12/2009 | Brown et al. | |
| 2002/0040393 A1 | 4/2002 | Christensen | |
| 2002/0052941 A1 | 5/2002 | Patterson | |

(Continued)

FOREIGN PATENT DOCUMENTS

EP    597592 A2 *   5/1994
EP    1455483 A2 *  9/2004

OTHER PUBLICATIONS

Edi—E, McNulty—R, Kechadi—T;Virtual structured P2P network topology for distributed computing;20060000;The Institution of Engineering and Technology;2007022;p. 9 pp.*

(Continued)

*Primary Examiner* — Ashok Patel
*Assistant Examiner* — Evans Desrosiers
(74) *Attorney, Agent, or Firm* — Perkins Coie LLP

(57) ABSTRACT

A method and system for discovering, defining, and implementing an application topology through the user of a graphical user interface is provided. A topology system may analyze the topology of an enterprise and provide a graphical representation of the application topology. The topology system may discover the application topology of an enterprise by accessing various configuration data stores of the enterprise. The topology system provides a graphical representation of the application topology and allows a user to modify the topology using a graphical user interface. The topology system may then control the implementation of the application topology.

20 Claims, 8 Drawing Sheets

U.S. PATENT DOCUMENTS

| | | | |
|---|---|---|---|
| 2003/0037322 A1 | 2/2003 | Kodosky et al. | |
| 2003/0131084 A1 | 7/2003 | Pizzorni et al. | |
| 2003/0184580 A1 | 10/2003 | Kodosky et al. | |
| 2004/0019894 A1 | 1/2004 | Willard et al. | |
| 2004/0045001 A1 | 3/2004 | Bryant | |
| 2004/0046785 A1 | 3/2004 | Keller | |
| 2004/0093400 A1 | 5/2004 | Richard et al. | |
| 2004/0210623 A1* | 10/2004 | Hydrie et al. | 709/201 |
| 2004/0225952 A1* | 11/2004 | Brown et al. | 714/819 |
| 2005/0114401 A1* | 5/2005 | Conkel | 707/200 |
| 2005/0174950 A1 | 8/2005 | Ayyagari | |
| 2006/0069801 A1 | 3/2006 | Rich et al. | |
| 2006/0074618 A1 | 4/2006 | Miller et al. | |
| 2006/0085785 A1* | 4/2006 | Garrett | 718/1 |
| 2006/0123022 A1 | 6/2006 | Bird | |
| 2006/0149408 A1 | 7/2006 | Speeter et al. | |
| 2006/0156274 A1 | 7/2006 | Andreev et al. | |
| 2006/0156294 A1 | 7/2006 | Fuller et al. | |
| 2006/0200818 A1 | 9/2006 | Oprea et al. | |
| 2006/0212569 A1* | 9/2006 | Ammerman et al. | 709/224 |
| 2007/0130366 A1* | 6/2007 | O'Connell et al. | 709/238 |

OTHER PUBLICATIONS

Sahai, Akhil and Christine Morin, "Towards Distributed and Dynamic Network Management," INRIA-IRISA, Campus de Beaulieu, France, 1998, 10 pages.

Ramaswamy, Lakshmish, Bugra Gedik and Ling Liu, "A Distributed Approach to Node Clustering in Decentralized Peer-to-Peer Networks," College of Computing, Georgia Institute of Technology, 2005, 30 pages.

Thaler, David G. and Chinya V. Ravishankar, "NView: A Visual Framework for Network Tool Integration," Electrical Engineering and Computer Science Department, The University of Michigan, © 1995 IEEE, pp. 283-289.

Bejerano, Yigal, Yuri Breitbart, Minos Garofalakis and Rajeev Rastogi, "Physical Topology Discovery for Large Multi-Subnet Networks," IEEE INFOCOM 2003, © 2003 IEEE, 11 pages.

"Network Node Manager advanced edition," Overview and Features, HP Invent Products, © 2005 Hewlett-Packard Development Company, L.P., http://managementsoftware.hp.com/products/nnm/index.html, (last accessed Apr. 18, 2006), 2 pages.

U.S. Appl. No. 11/324,005, filed Dec. 30, 2005, Nedelcu et al.

Rangarajan, Raghuraman and Sridhar Iyer, "Automatic Topology Generation for a Class of Wireless Newtorks," KReSIT, IIT, Bombay, India, 2000, 5 pages.

Jun, Kyungkoo, "Agent-Based Resource Discovery," Purdue University, Computer Sciences Department, Oct. 8, 1999 (18 pages).

U.S. Office Action dated Jun. 9, 2009 cited in U.S. Appl. No. 11/324,005 [13 pages].

Response to Office Action filed Sep. 17, 2009 for U.S. Appl. No. 11/324,005 [10 pages].

U.S. Appl. No. 12/773,615, filed May 4, 2010, Nedelcu et al.

\* cited by examiner

IMPLEMENTING COMPUTER APPLICATION TOPOLOGIES ON VIRTUAL MACHINES

BACKGROUND

The deployment of application topologies within an enterprise is both error-prone and time-consuming. Moreover, the number of errors during deployment and the time of deployment increase as the complexity of an application topology increases. In addition, an error in the deployment of an application topology may result in significant loss in productivity of the enterprise. For example, the error may result in an application that is critical to the enterprise being unavailable. The application topology of an enterprise is typically defined by a system administrator. The system administrator may decide the interconnection between the computers and decide which applications should execute on which server and client computers. The system administrator for a large enterprise may define various domains for the computers of the enterprise. For example, the system administrator may define a domain for each location of the enterprise and specify that each of the domains has a trust relationship with the other domains. The system administrator may also specify the applications that should be installed on each computer. The applications that should be installed on a computer depend upon the roles assigned to that computer. For example, the system administrator may assign one computer the role of domain controller, another computer the role of domain name service for the computers of the domain, another computer the role of certificate authority for the domain, and so on. Other roles may include electronic mail server, network meeting server, and so on. To provide the services of these roles, each of the computers needs to have installed the applications (i.e., the software components) necessary to perform those roles.

As the application topology of an enterprise evolves over time, it can even be difficult for a system administrator to determine what is the current application topology. As a result, it can be difficult for the system administrator to know the consequences of a change to the application topology. For example, a system administrator may inadvertently move a critical application from one computer to another computer that may not have the needed processing power or that may not be connected to all the computers that need the services of that application. Thus, the system administrator may only fully understand the consequences of a change to an application topology after implementation. Any unintended consequences, however, may result in failure of one or more applications of the network or even failure of the network itself.

SUMMARY

A method and system for discovering, defining, and implementing an application topology through the use of a graphical user interface is provided. A topology system may analyze the topology of an enterprise and provide a graphical representation of the application topology. The application topology may specify each computer, each network, and each application of the enterprise along with which computers are connected to which networks and which computers are associated with which applications. The topology system may discover the application topology of an enterprise by accessing various configuration data stores (e.g., Active Directory) of the enterprise. The topology system provides a graphical representation of the application topology and allows a user to modify the topology using a graphical user interface. The topology system may have various constraints that specify the minimum requirements of a computer that is to the associated with an application. The topology system may then control the implementation of the application topology. After a user modifies a topology using the graphical user interface, the topology system may create an implementation package for each computer of the topology. Upon receiving an implementation package, a computer configures itself in accordance with the implementation package.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
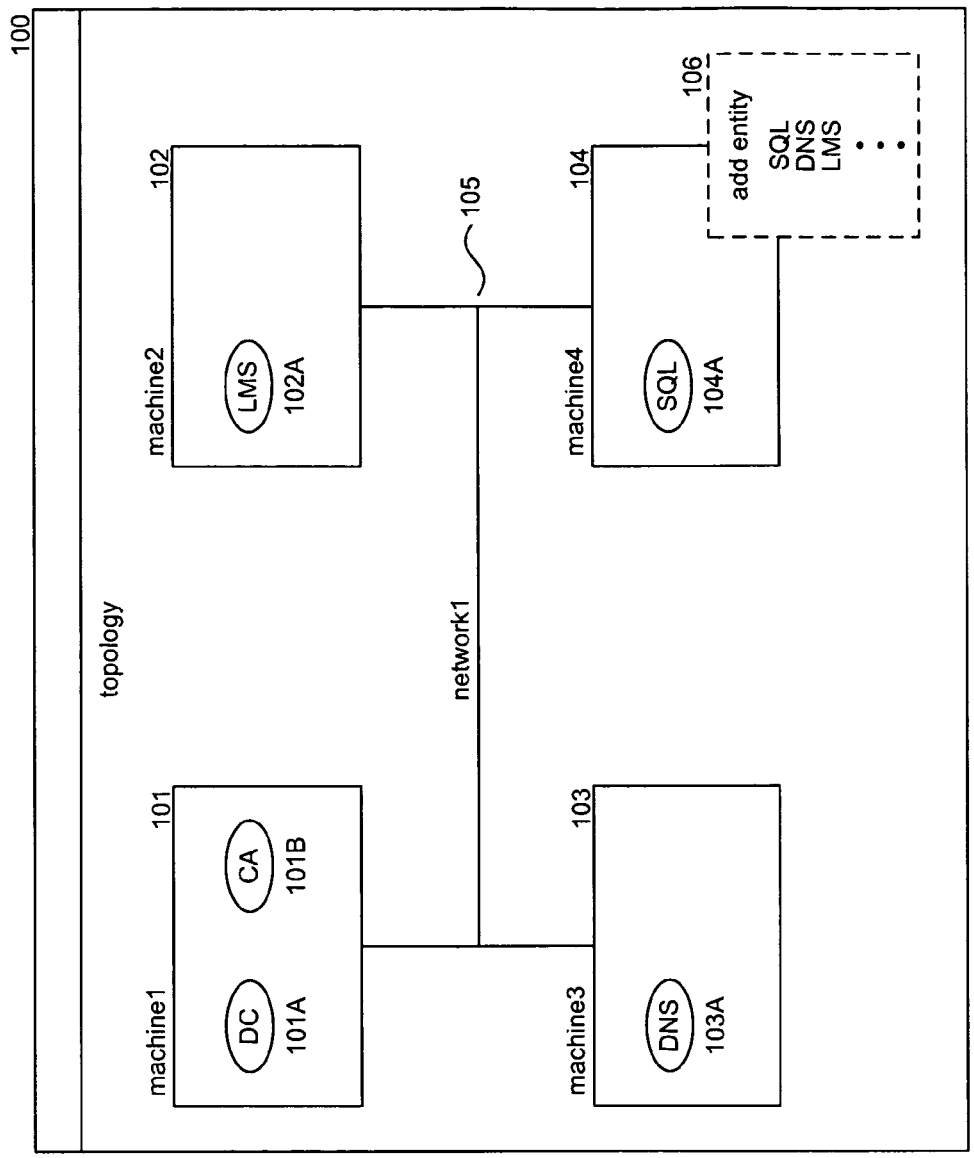
FIG. 1 is a display page that illustrates a graphical user interface for viewing and modifying an application topology in one embodiment.

A method and system for discovering, defining, and implementing an application topology through the use of a graphical user interface is provided. In one embodiment, the topology system may analyze the topology of an enterprise and provide a graphical representation of the application topology. The application topology may specify each computer, each network, and each application of the enterprise along with which computers are connected to which networks and which computers are associated with (or loaded with) which applications. The topology system may discover the application topology of an enterprise by accessing various configuration data stores (e.g., Active Directory) of the enterprise. The topology system provides a graphical representation of the application topology and allows a user to modify the topology using a graphical user interface. The topology system may allow the user to select a computer and then select one or more applications to be associated with that computer. The topology system may have various constraints that specify the minimum requirements of a computer that is to the associated with an application. For example, an application may require a certain minimum amount of main memory, access to certain servers, and so on. The topology system may also allow the user to specify the domains to which each computer is to belong. The topology system updates the graphical representation of the topology to reflect the changes to the applications and the networks. The discovery and graphical user interface allows a user to view an accurate representation of the topology and to ensure that changes to the topology satisfy the constraints.

In one embodiment, the topology system may provide an implementation component that controls the implementation of an application topology. After a user modifies a topology using the graphical user interface, the topology system may create an implementation package for each computer of the topology. The implementation package may identify the domains to which the computer belongs, the applications associated with the computer, the configuration parameters for the applications, and so on. The topology system then distributes the implementation packages to the computers of the enterprise. Upon receiving an implementation package, a computer configures itself in accordance with the implementation package. After the computers are configured, the topology system may then verify the correctness of the implementation by discovering the actual topology. The topology system can then compare the actual topology to the desired topology to determine whether the desired topology was implemented correctly.

In one embodiment, the topology system allows an application topology to be implemented on a computer that hosts various virtual machines. The implementation via virtual machines may provide an effective mechanism for testing an application topology before it is deployed to the real computers. A system administrator can run various tests on the virtual machines to identify any unintended consequences of the topology. Alternatively, the actual implementation may be on a host computer with virtual machines. For example, a host computer may be a multi-processor system that can support many virtual machines. Certain applications may require that they be the only application executing on a server. In such a case, the system administrator may specify that multiples of those applications execute on the same host machine but as separate virtual machines.

The topology system provides schemas for defining application topologies, constraints on application topologies, entities of application topologies, and user interface data for specifying application topologies. Table 1 illustrates a schema for an application topology. The term "entity" refers to any component of an application topology. The components may include server applications, server machines, client machines, firewalls, load-balancers, and so on. The terms "computer" and "machine" refer to any computing device. The attributes of the elements of the schema are listed in parentheses after the element name. The indentations illustrate the hierarchy of the elements, and the superscript infinity symbol (i.e., ∞) indicates that the element can be repeated. In one embodiment, the data for the topology system is implemented using an extensible Mark-up Language ("XML").

TABLE 1

Application Topology Schema

| Element | Description |
|---|---|
| Topology (Name; DeploymentType = VirtualServer, RealMachine, or Mixed) | An organization of machines into domains, domains into domain trees, and domain trees into a forest. The DeploymentType attribute indicates whether the topology is implemented on real or virtual machines. |

TABLE 1-continued

Application Topology Schema

| Element | Description |
|---|---|
| Forest$^\infty$ (Name, Root) | A hierarchy of organization of domains into a forest |
| Machines | The machines of the topology |
| machine$^\infty$ (type = Guest or Host) | A specific machine of the topology |
| role$^\infty$ | Various roles of the machine (e.g., DNS, DC) |
| Name | Name of the machine |
| Domain | Domain of the machine |
| RamSizeMB | Size of main memory of the machine |
| isWorkGroup | Whether the machine is part of a work group and not a domain |
| CAFqdn | Fully qualified domain name of certificate authority for the machine |
| Parent | Domain or forest that contains the machine |
| osName | Operating system name of the machine |
| spName | Operating system service pack of the operating system |
| Network$^\infty$ (name) | Networks to which the machine is connected |
| IsDHCPEnable | Whether the Dynamic Host Configuration Protocol is enabled for the network |
| Ip | Internet Protocol address of the machine on the network |
| subnetMask | Subnet mask of the network |
| defaultGateway | Default gateway of the network |
| Dns | Domain name service of the network |
| entities | Entities of the machines |
| entity$^\infty$ (name, role, version) | An entity of the machine |
| MachineName | The machine with which the entity is associated |
| ParentName | Parent name (e.g., forest or domain) of the machine |
| Path | Path to the setup file |
| setupfilename | File for setting up the entity on the machine |

Table 2 specifies a schema for defining the entities that can be specified as part of the topology. The definition specifies the properties and configuration data for entities with different roles and version.

TABLE 2

Entity Schema

| Element | Description |
|---|---|
| Entity$^\infty$ | |
| role | Role of entity |
| version | Version of entity |
| property$^\infty$ (name, isNull) | Properties of the entity |
| type | Type of property |
| default | Default value of property |
| isIPAdress | Indicates whether property is an IP address |
| min | Minimum value of property |
| max | Maximum value of property |
| isArray | Indicates whether the property is an array |
| configData | Configuration data of entity |
| wmiSchemaVersion | Schema version |
| class$^\infty$ (name, isExportable, isList) | Classes of configuration data |
| property$^\infty$ | Properties of configuration data of entity |
| ... | |

Table 3 specifies a schema for the constraints of the topology system. A provider of an entity may specify the constraints for the entity. Also, a system administrator may define various constraints to enforce the policy of an enterprise. For example, the enterprise may allow a certain application to only be installed on a computer that has a certain security application also installed. The constraints schema specifies constraints for the entities, connections, and overall system.

TABLE 3

Constraints Schema

| Element | Description |
| --- | --- |
| Constraints | Constraints of entities |
| entities | Constraints on the topology required by the entities |
| entity∞ | An entity |
| role | Role of the entity (e.g., DNS) |
| version | Version of the entity |
| constraints | Constraints for the entity |
| constraint∞ | A constraint for the entity |
| conditionset∞ | Conditions of the constraint; a condition indicates a first and second operand, an operator, and valid result. If condition has the valid result, then the constraint is satisfied. |
| conditionset∞ | Recursive definition of condition set |
| fieldValue (role, version, class, property) | An operand |
| entityValue (role, version) | An operand |
| operator | Operator (e.g., GT, GE) |
| constantValue | An operand |
| validResult | Result when condition is satisfied |
| errors | Possible errors |
| error∞ | A possible error |
| invalidResult | Result when this error occurs |
| errorCode | Code for reporting this error |
| system | Constraints on the topology required by the overall system |
| constraints | |
| ... | |
| connections | Constraints on the topology required by the connections |

Table 4 specifies a schema for defining how entity properties are organized for the user interface. The definition specifies the organization of properties of the entities into categories. The schema also specifies the icons for the entities.

TABLE 4

User Interface Schema

| Element | Description |
| --- | --- |
| shapes_map | Specification of shapes of icons for the entities |
| map∞ (entity_role shape_name) | Shape of an icon for an entity with a role; the shape name identifies the icon |
| entity∞ | Definition of an entity |
| role | Role of the entity (e.g., Certificate Authority) |
| version | |
| common | Properties of the entity from a common set of properties |
| wmiproperty∞ (name, isVisible, isReadOnly) | List of properties |
| categories | Categories of entity-specific properties |
| category∞ (name, isList) | A category of properties |
| roots | Collections of properties within the category |
| root∞ (name) | A collection of properties |
| wmiclasses | Classes of properties within the collection |
| wmiclass∞ (name, isList) | A class of properties |
| wmiproperty∞ (name, isVisible, isReadOnly) | List of properties |

Table 5 illustrates the user interface schema text of the user interface. The text is specified as mappings of internal names to display names. A system administrator may customize the user interface by modifying the user interface data that is stored using this schema.

TABLE 5

User Interface Localization Schema

| Element | Description |
| --- | --- |
| DisplayInfo | User interface information for entities |
| entities | User interface names for entities |
| entity∞ | User interface names for an entity |
| role | Role of the entity |
| version | Version of the entity |
| item∞ | Items of the entity |
| name | Internal name of the item |
| display_name | Display name of the item |
| display_description | Display description of the item |
| display_tooltip | Display tooltip for the item |

FIG. 1 is a display page that illustrates a graphical user interface for viewing and modifying an application topology in one embodiment. The display page 100 displays an application topology that includes machines 101, 102, 103, and 104. The machines are each connected to a network 105. Machine 101 has associated applications 101A and 101B. Application 101A provides the role of domain controller, and application 101B provides the role of certificate authority. In this example, the applications are illustrated with an oval shape that encompasses the initials suggestive of the role of the application. Alternatively, each application could be represented by a different shape (e.g., star or triangle), different color, different highlighting, and so on. Machines 102, 103, and 104 have associated applications 102A, 103A, and 104A, respectively. Although not shown, the network addresses of each machine may also be displayed. The topology system generates the graphical user interface from the application topology that is specified using the application topology schema of Table 1. When a user wants to add an application to a machine, the user may right click on a machine to view the applications that are available to be added. The topology system may list the applications in a pop-up window such as window 106. In one embodiment, the available applications are specified using the entity schema of Table 3. The topology system may list in the pop-up window all the available applications, only those whose constraints are satisfied by the machine, or all available applications along with an indication of whether their constraints are satisfied by the machine. When a user selects an application, the topology system associates that application with the machine and displays an icon within the machine indicating the association. In one embodiment, the topology system may dynamically validate the constraints as applications are added to machines. Alternatively, the topology system may check the constraints when requested by a user and/or when the implementation packages are created. The topology system uses the user interface schema to provide display names for the various internal names.

Figure 2:
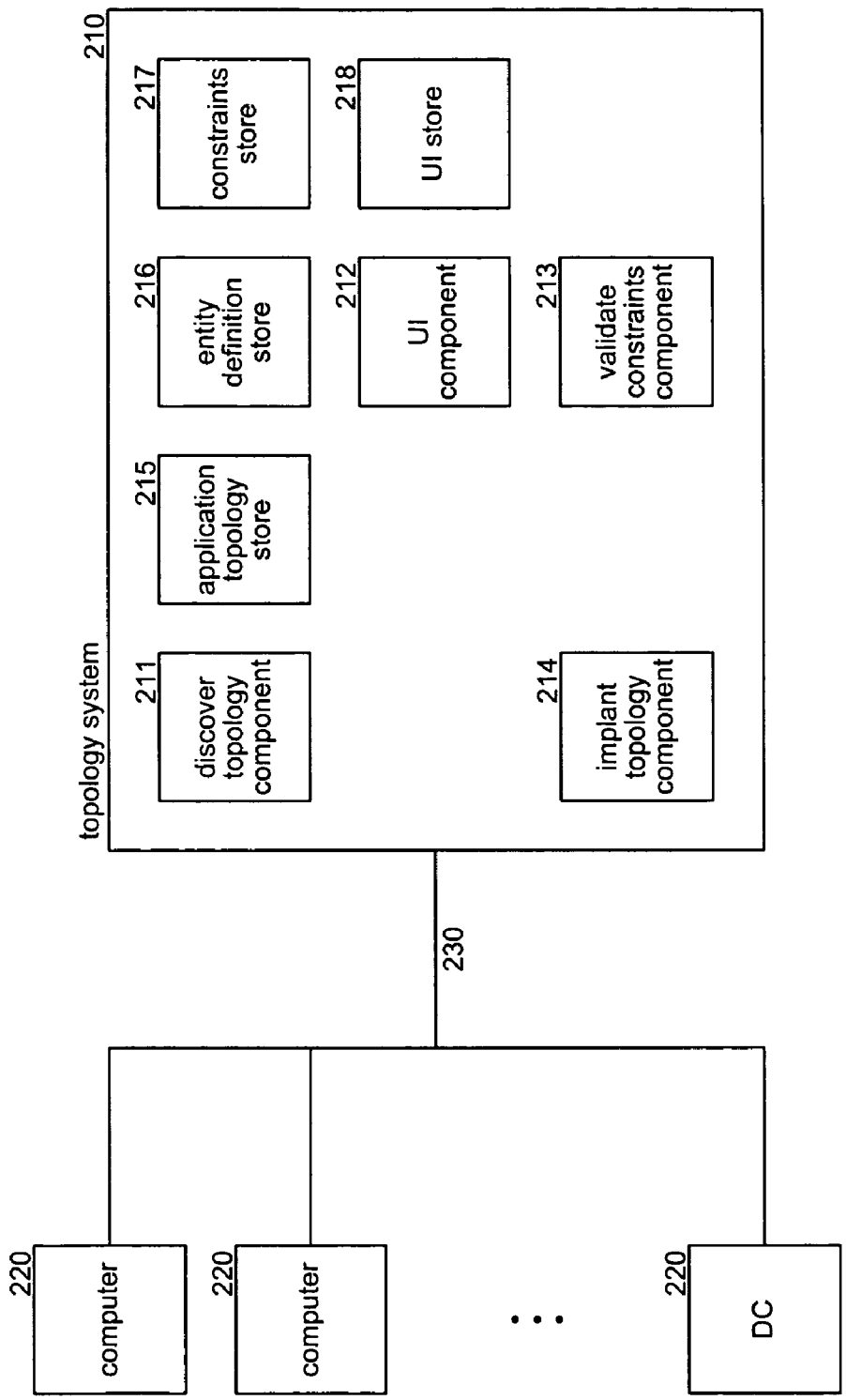
FIG. 2 is a block diagram that illustrates components of the topology system in one embodiment.

FIG. 2 is a block diagram that illustrates components of the topology system in one embodiment. The topology system 210 may execute on a computer that is connected to other computers 220 via a communications link 230. The topology system may include various data stores such as an application topology store 215, an entity definition store 216, a constraints store 217, and a user interface store 218. The application topology store contains a description of the application topology using the application topology schema. The entity definition store contains a description of the available entities. The constraints store contains a description of the constraints of the system using the constraints schema. The user interface store contains descriptions of application shapes and display names using the user interface schema.

The topology system may include a discover topology component 211, a user interface component 212, a validate constraints component 213, and an implement topology component 214. The discover topology component determines the application topology of an existing network. If the discover topology component has access to at least one computer of a network, it may be able to discover the topology of that network. The discover topology component may query the accessible computer to identify the domain controller of the network, query the domain controller to identify the Active Directory server, and query the Active Directory and other computers of the network to determine the application topology. The discover topology component stores the application topology in the application topology store. The user interface component displays a graphical representation of the application topology described in the application topology store using the shapes and display names of the user interface store. The user interface component may allow the user to modify the application topology based on the applications defined in the entity definition store and the constraints of the constraints store. In one embodiment, a user may modify the data of the entity definition store, constraints store, and user interface store to reflect available applications, desired constraints, and desired user interface. The validate constraints component applies each of the constraints of the constraints store to the application topology of the application topology store to determine whether the constraints are satisfied. The implement topology component generates implementation packages for distribution to the various computers to implement the application topology. An implementation package may identify how to set up the computer for each application associated with the computer including installing the code and setting configuration information for the application. The configuration information for the application may be defined in the entity definition store for the application.

The computing devices on which the topology system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the topology system. In addition, the data structures and message structures may be stored or transmitted via a data transmission medium, such as a signal on a communications link. Various communications links may be used, such as the Internet, a local area network, a wide area network, or a point-to-point dial-up connection.

The topology system may be used in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. The topology system may also be used in computing devices such as cell phones, personal digital assistants, consumer electronics, home automation devices, and so on. The topology system may be used to implement applications on various types of servers such as electronic mail servers, web servers, database servers, hosted application servers, telephony servers, instant messaging servers, SIP servers, proxy servers, and so on.

The topology system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the user interface component may be executed on a computer system different from that on which the discover topology component executes.

Figure 3:
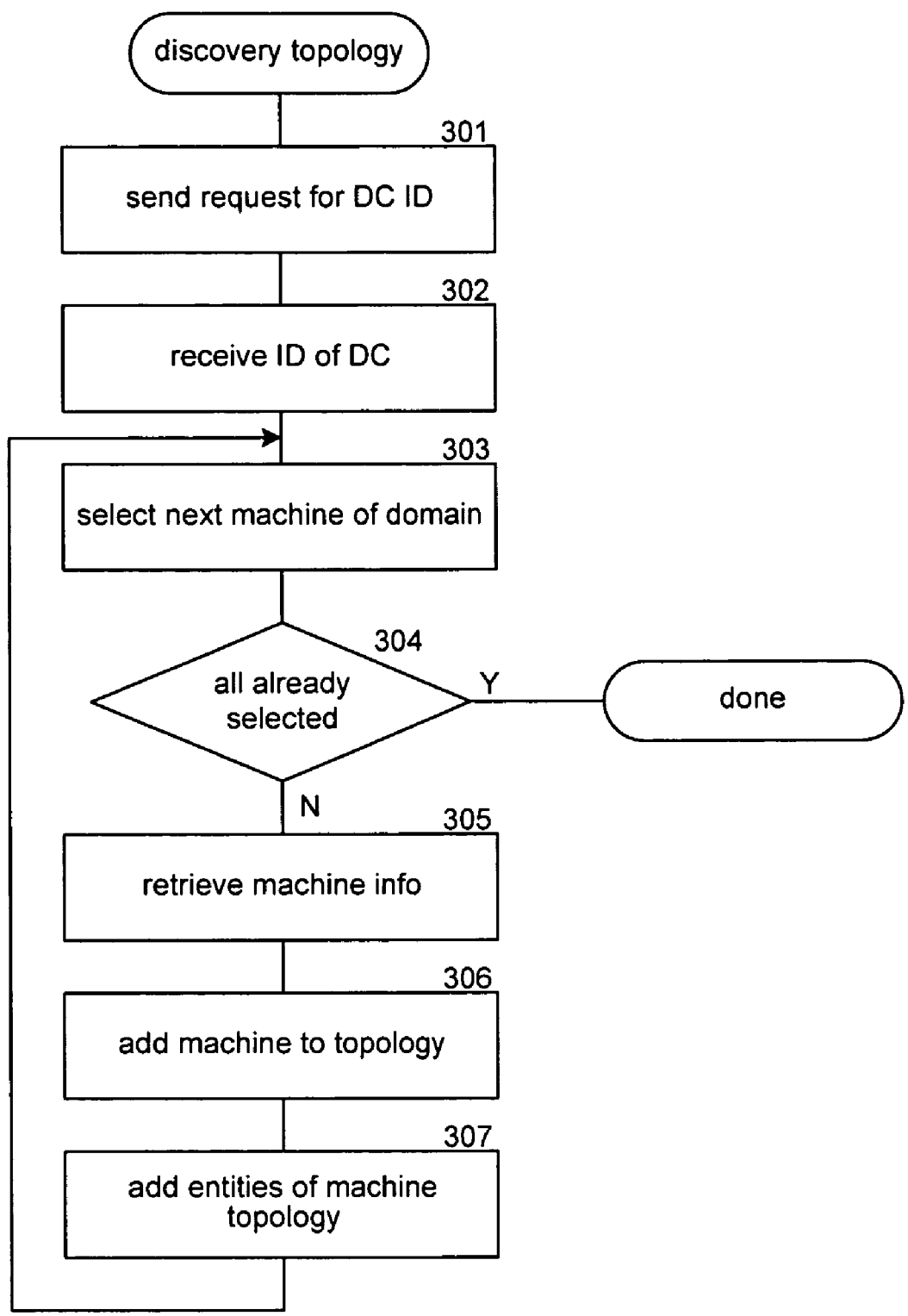
FIG. 3 is a flow diagram that illustrates the processing of the discover topology component of the topology system in one embodiment.

FIG. 3 is a flow diagram that illustrates the processing of the discover topology component of the topology system in one embodiment. The component may be passed an indication of a domain and may have access to a computer of that domain. In block 301, the component sends a request to a computer of the domain to identify the domain controller. In block 302, the component receives the identification of the domain controller. In blocks 303-307, the component loops determining the application topology associated with each machine of the domain. In block 303, the component selects the next machine of the domain. In decision block 304, if all the machines have already been selected, then the component completes, else the component continues at block 305. In block 305, the component retrieves information of the machine from the machine itself or from the Active Directory or other system registry of the domain. In block 306, the component adds an indication (e.g., XML element) of the machine to the application topology store. In block 307, the component adds indications of the entities of the machine to the application topology store and then loops to block 303 to select the next machine of the domain.

Figure 4:
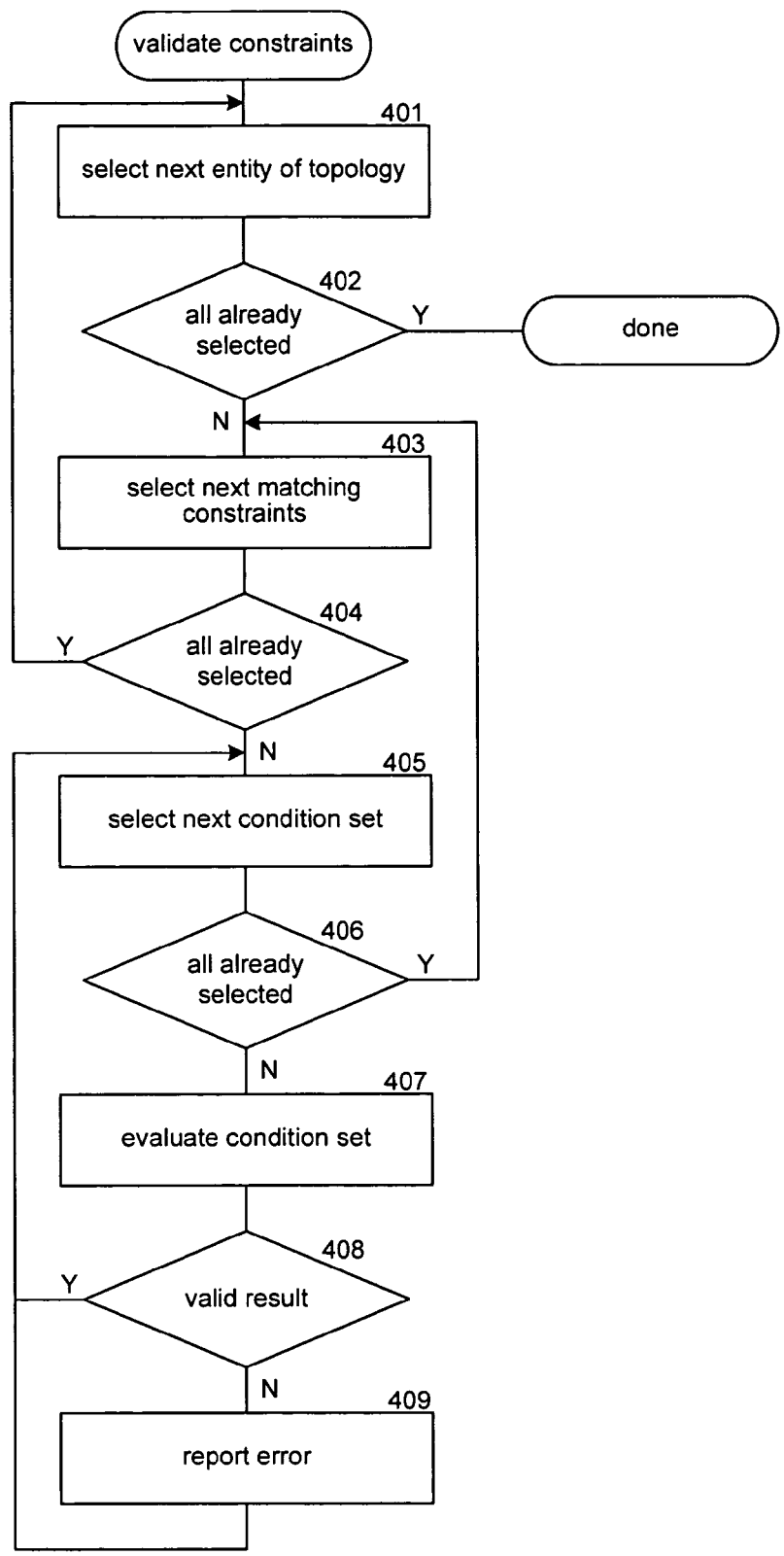
FIG. 4 is a flow diagram that illustrates the processing of the validate constraints component of the topology system in one embodiment.

FIG. 4 is a flow diagram that illustrates the processing of the validate constraints component of the topology system in one embodiment. The component determines whether the application topology of the application topology store satisfies the constraints of the constraints store. In block 401, the component selects the next entity of the topology as indicated by the application topology store. In decision block 402, if all the entities have already been selected, then the component completes, else the component continues at block 403. In blocks 403-409, the component loops determining whether the machine associated with the selected entity satisfies its constraints. In block 403, the component selects the next matching constraint. A constraint is matching when it satisfies the role and version of the selected entity. In decision block 404, if all the matching constraints have already been selected, then the component loops to block 401 to select the next entity, else the component continues at block 405. In block 405, the component selects the next condition set of the selected constraint. In decision block 406, if all the condition sets have already been selected, then the component loops to block 403 to select the next matching constraint, else the component continues at block 407. In block 407, the component evaluates the selected condition set. In decision block 408, if the result of the evaluation is valid, then the component loops to block 405 to select the next condition set, else the component continues at block 409. In block 409, the component reports the error code that matches the error result and then loops to block 405 to select the next condition set.

Figure 5:
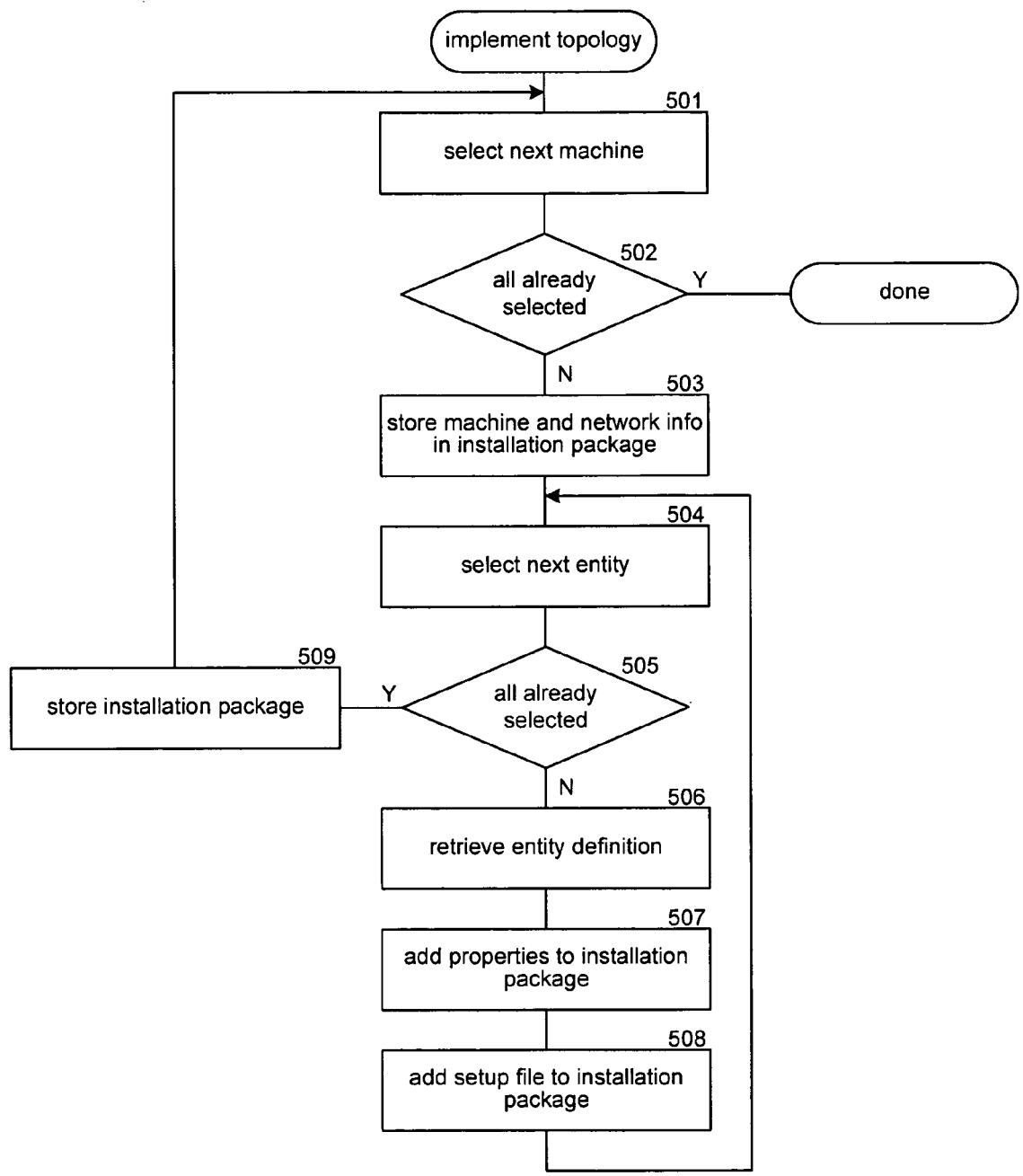
FIG. 5 is a flow diagram that illustrates the processing of the implement topology component of the topology system in one embodiment.

FIG. 5 is a flow diagram that illustrates the processing of the implement topology component of the topology system in one embodiment. The component generates implementation or installation packages to implement the application topology of the application topology store. The implementation packages are then distributed to the machines to effect the implementation of the topology. In block 501, the component selects the next machine. In decision block 502, if all the machines have already been selected, then the component completes, else the component continues at block 503. In block 503, the component stores machine and network information in the installation package for the selected machine. In blocks 504-508, the component loops adding entity information to the installation package for the selected machine. In block 504, the component selects the next entity associated with the selected machine. In block 505, if all the entities have already been selected, then the component continues at block 509, else the component continues at block 506. In block 506, the component retrieves the entity definition from the entity definition store. In block 507, the component adds the properties of the selected entity to the installation package. In block 508, the component adds an indication of the setup file to the installation package. The component then loops to block 504 to select the next entity that is associated with the selected machine. In block 509, the component stores the installation package for distribution and then loops to block 501 to select the next machine.

Figure 6:
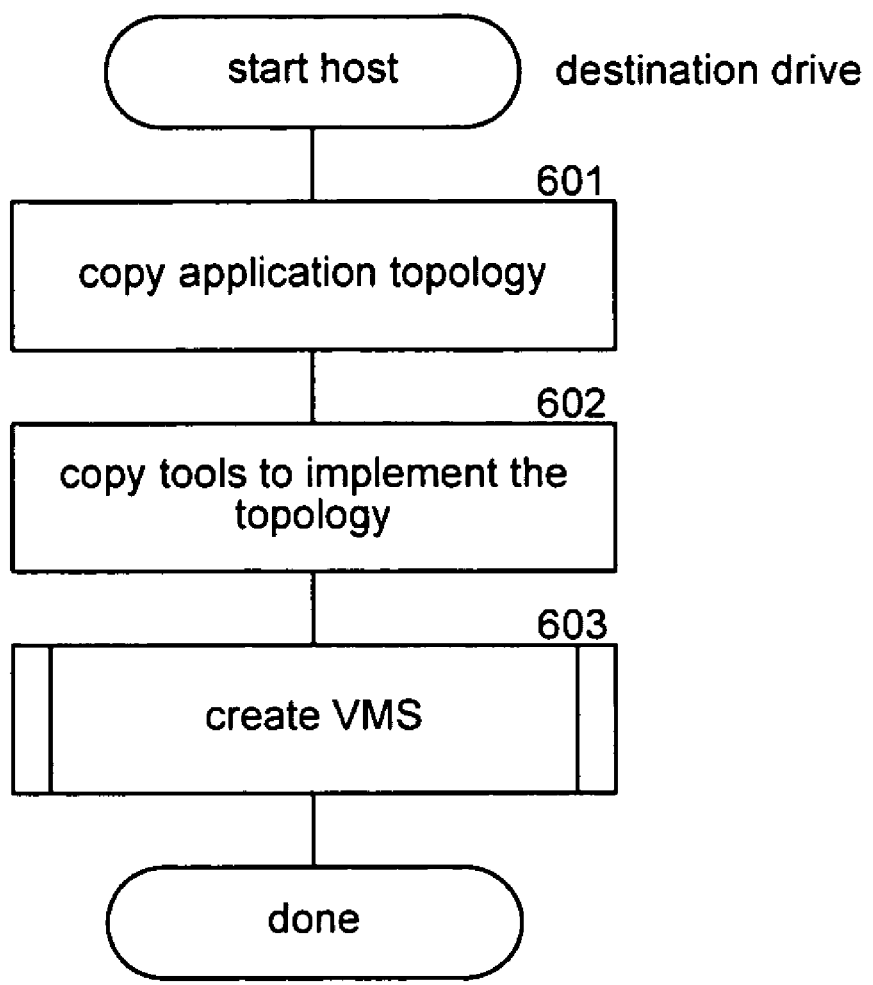
FIG. 6 is a flow diagram that illustrates the processing of a component that configures a virtual machine host to implement an application topology in one embodiment.

FIG. 6 is a flow diagram that illustrates the processing of a component that configures a virtual machine host to implement an application topology in one embodiment. The component is passed a destination drive and starts the process of creating and configuring the virtual machines. In block 601, the component copies the application topology from the application topology store. In block 602, the component copies various tools needed to implement the application topology. In block 603, the component invokes a create virtual machine component to control the configuring of the virtual machines. The component then completes.

Figure 7:
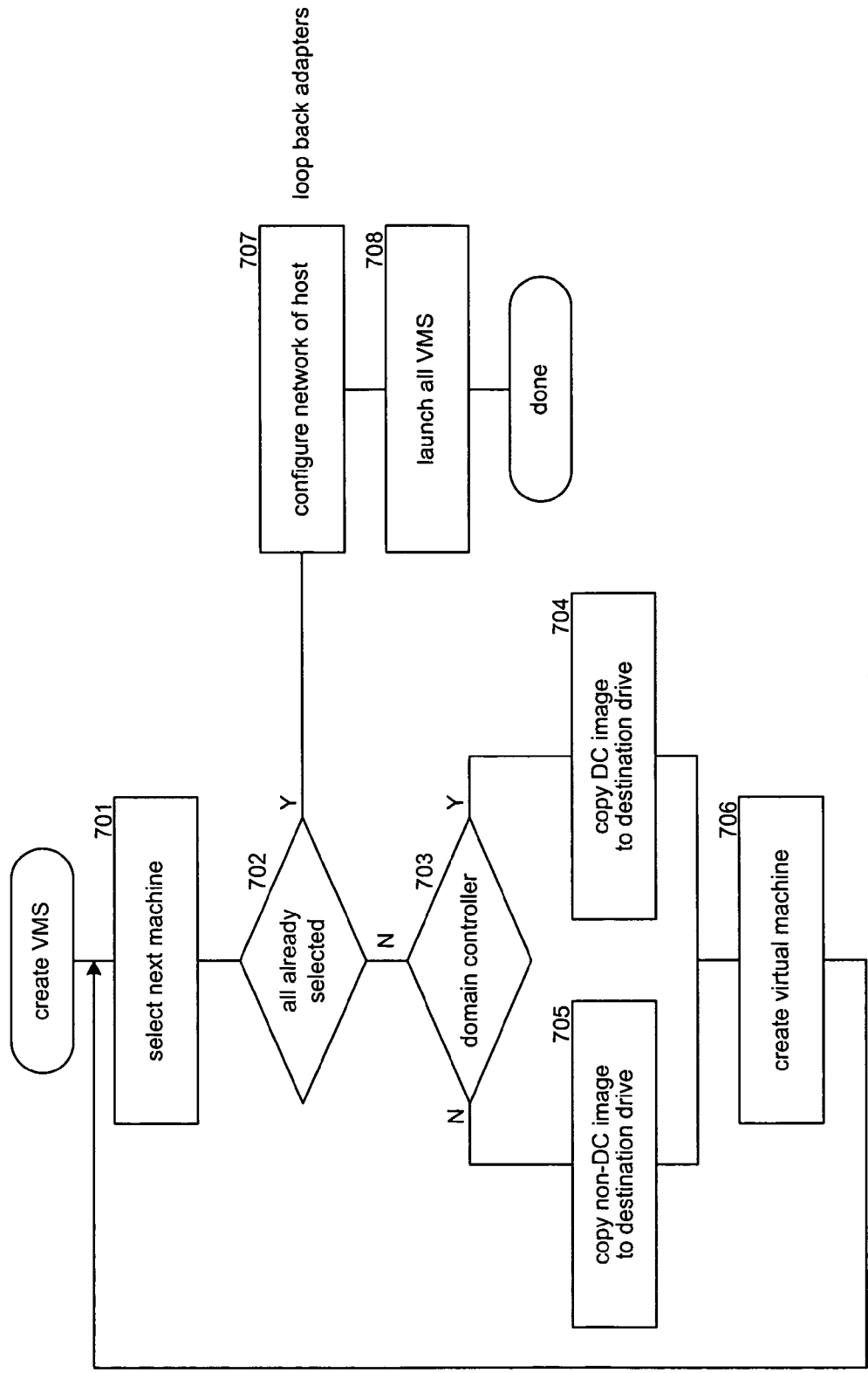
FIG. 7 is a flow diagram that illustrates the processing of the create virtual machines component of the topology system in one embodiment.

FIG. 7 is a flow diagram that illustrates the processing of the create virtual machines component of the topology system in one embodiment. The component creates the virtual machines and then launches the virtual machines so that each virtual machine can configure itself. In block 701, the component selects the next machine of the application topology. In block 702, if all the machines have already been selected, then the component continues at block 707, else the component continues at block 703. In block 703, if the selected machine is a domain controller, then the component continues at block 704, else the component continues at block 705. In block 704, the component copies an image of the software for a domain controller to the destination drive. In block 705, the component copies an image of the software for a non-domain controller to the destination drive. In block 706, the component creates a virtual machine for the selected machine and then loops to block 701 to select the next machine. In block 707, the component configures the network of the host including adding a loopback adapter as appropriate. In block 708, the component launches all the created virtual machines and then completes.

Figure 8:
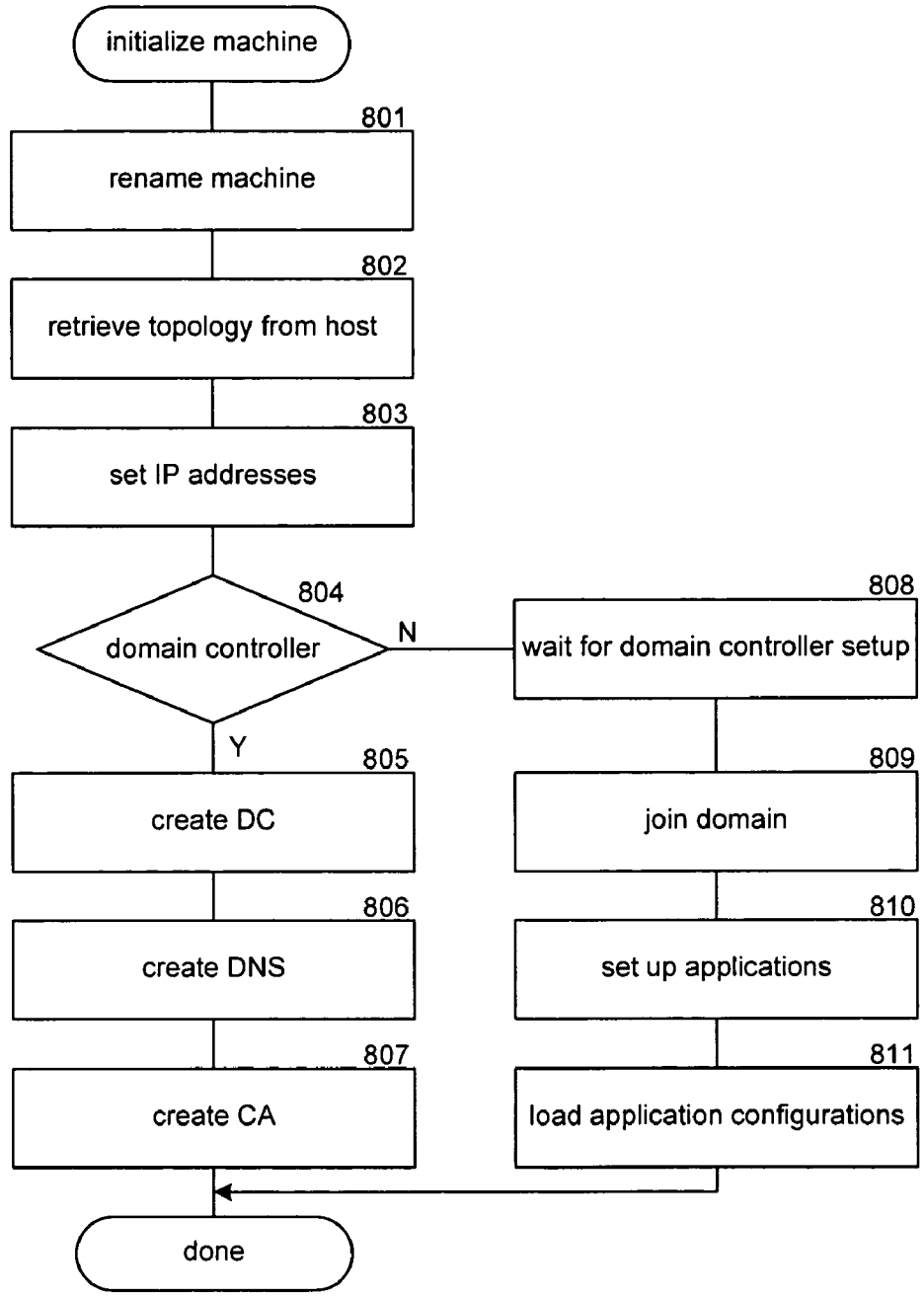
FIG. 8 is a flow diagram that illustrates the processing of the initialize machine component of the topology system in one embodiment.

FIG. 8 is a flow diagram that illustrates the processing of the initialize machine component of the topology system in one embodiment. The component may be executed on real machines or virtual machines to implement the application topology. The component may operate slightly differently on real machines and virtual machines. In particular, the component executing on a virtual machine may need to reboot the virtual machine at various points during execution. In block 801, the component renames the machine to a random name. In block 802, the component retrieves the application topology. In block 803, the component sets the network addresses for the machine. In decision block 804, if the machine is to serve as a domain controller, then the component continues at block 805, else the component continues at block 808. In blocks 805-807, the component sets up various roles for the domain controller such as the domain controller, domain name service, or certificate authority. The component then completes. In blocks 808-811, the component performs the processing when the machine is not a domain controller. In block 808, the machine waits for the domain controller to be set up. In block 809, the component controls the joining of the machine to the domain. In block 810, the component sets up the applications for the machine as indicated in the application topology. In block 811, the component configures the application by, for example, storing information in the system registry such as the Active Directory. The component then completes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A computer system for implementing an application topology on a host computer as virtual machines for testing the application topology before deploying the application topology to real computers, comprising:

a component that discovers the application topology of computers;

a topology store that stores the discovered application topology that includes, for each computer represented by the application topology, an indication of a network to which the computer is connected, an indication of applications that are associated with the computer, and configuration parameters for the applications;

a create topology component that executes on the host computer and, for each computer of the application topology, creates, configures, and launches a virtual machine in accordance with the application topology, the launched virtual machine executing on the host computer;

an initialize virtual machine component that executes on each launched virtual machine for a computer and initializes applications associated with the computer in accordance with the application topology;

a test component for running tests on the virtual machines, the test component executing on each launched virtual machine to test the application topology before deploying the application topology to the computers; and a component that, after the test component runs tests on the virtual machines, deploys the application topology to the computers.

2. The computer system of claim 1 wherein the create topology component copies an image for each virtual machine to a destination drive.

3. The computer system of claim 2 wherein the image that is copied is either a domain controller image or a non-domain controller image.

4. The computer system of claim 1 wherein the initialize virtual machine component performs either domain controller processing or non-domain controller processing.

5. The computer system of claim 4 wherein when a virtual machine is not a domain controller, it waits until a domain controller completes initialization before configuring its applications.

6. The computer system of claim 5 wherein a virtual machine that is not a domain controller joins a domain, and sets up and configures the associated applications.

7. The computer system of claim 4 wherein when the virtual machine is a domain controller, the virtual machine optionally establishes itself as a domain name service or a certificate authority.

8. The computer system of claim 1 wherein the topology specifies network addresses of the computers and the initialize virtual machine component sets up the network address of the virtual machine.

9. The computer system of claim 1 wherein the create topology component configures the network for the host of the topology.

10. The computer system of claim 1 wherein the topology of the host computer specifies that the virtual machines interact with real machines.

11. The computer system of claim 1 including a graphical user interface component that allows a user to specify the topology by selecting displayed computers and associating selected applications.

12. A method for implementing an application topology on a host computer for testing the application topology using virtual machines before deploying the application topology to real computers of the application topology, the method comprising:

providing an application topology that includes, for each computer represented by the topology, an indication of networks to which the computer is connected, an indication of applications that are associated with the computer, and configuration parameters of the applications; and for each computer of the application topology,
creating a virtual machine on the host to execute the applications of the computer;
launching the virtual machine to execute on the host computer in accordance with the application topology;
when the virtual machine is launched, executing on the virtual machine an initialization component to initialize applications associated with the computer on the virtual machine in accordance with the application topology and the configuration parameters of the applications; and
after the virtual machine is initialized, executing on the virtual machine a test component so that the application topology can be tested using virtual machines before deploying the application topology to the real machines.

13. The method of claim 12 including, for each computer of the topology, copying an image for a virtual machine to a destination drive.

14. The method of claim 13 wherein the image that is copied is either a domain controller image or a non-domain controller image.

15. The method of claim 12 wherein a virtual machine performs either domain controller processing or non-domain controller processing.

16. The method of claim 15 wherein when a virtual machine is not a domain controller, it waits until a domain controller completes initialization before configuring its applications.

17. The method of claim 16 wherein a virtual machine that is not a domain controller joins a domain, and sets up and configures the associated applications.

18. A computer-readable storage device containing instructions for controlling a computer system to implement a modified application topology of an enterprise on a host computer for testing the modified application topology using virtual machines before deploying the application topology to real machines, by a method comprising:

discovering a current application topology of the enterprise by accessing various configuration data stores of the enterprise stored at the real machines, the current application topology including current connections between the real machines;

providing a graphical user interface for graphically displaying the current application topology and through which a user can graphically specify the modified application topology that includes, for real machines represented by the application topology, an indication of networks to which the real machine is connected, an indication of applications that are associated with the real machine, and configuration parameters for the applications associated with the real machine; and for each real machine of the application topology,
copying an image for the real machine to a destination drive of the host computer;
creating a virtual machine for the real machine based on the copied image;
launching the virtual machine to execute on the host computer in accordance with the modified application topology;
when the virtual machine is launched, executing on the virtual machine an initialization component to initialize applications associated with the real machine on the virtual machine in accordance with the modified application topology and the configuration parameters of the applications; and
after the virtual machine is initialized, executing on the virtual machine a test component so that the modified application topology can be tested using the virtual machine before deploying to the real machines.

19. The computer-readable storage device of claim 18 wherein when a virtual machine is a not a domain controller, it waits until a domain controller completes initialization before configuring its applications.

20. The computer-readable storage device of claim 18 including allowing a user to specify the topology by selecting displayed real machines and associating selected applications.

* * * * *